United States Patent [19]

Warren

[11] 4,309,734

[45] Jan. 5, 1982

[54] METHODS AND APPARATUS FOR LIMITING ELECTRICAL CURRENT TO A SUBSEA PETROLEUM INSTALLATION

[75] Inventor: Walter B. Warren, Seabrook, Tex.

[73] Assignee: TRW Inc., Redondo Beach, Calif.

[21] Appl. No.: 91,536

[22] Filed: Nov. 5, 1979

[51] Int. Cl.³ ............................................. H02H 7/26
[52] U.S. Cl. .................................... 361/58; 323/263; 361/100
[58] Field of Search ................... 323/4, 9, 45, 50, 86, 323/259, 263, 344; 361/58, 100, 71, 74

[56] References Cited

U.S. PATENT DOCUMENTS

| | | | |
|---|---|---|---|
| 1,571,304 | 2/1926 | Sindeband et al. | 323/86 X |
| 3,182,249 | 5/1965 | Pahlavan | 323/50 X |
| 3,610,944 | 10/1971 | Mitsui et al. | 323/45 X |
| 3,908,163 | 9/1975 | Gilmore | 323/45 X |
| 3,939,395 | 2/1976 | Prestridge et al. | 323/4 |

FOREIGN PATENT DOCUMENTS

| | | | |
|---|---|---|---|
| 2210625 | 9/1978 | Fed. Rep. of Germany | 323/9 |
| 130084 | 3/1978 | German Democratic Rep. | 361/58 |
| 47-28488 | 7/1972 | Japan | 323/9 |

Primary Examiner—A. D. Pellinen
Attorney, Agent, or Firm—Robert W. Keller; Benjamin DeWitt; Loren G. Helmreich

[57] ABSTRACT

This invention relates to the distribution of electrical power to subsea petroleum recovery installations, and more particularly to methods and apparatus for sensing and limiting the electrical current drawn through power cables disposed on the sea floor. A transformer having primary winding and a secondary winding is located at a subsea power distribution module and has its primary winding connected in series with the power cable. A variable impedance device is connected to the secondary winding and is actuated, in response to a control signal indicative of the current drawn through the power cable, to substantially open-circuit the secondary winding when the current exceeds a predetermined value. Additionally, the variable impedance device substantially short-circuits the secondary winding when the load current falls to a level less than a preselected minimum value. In a preferred embodiment, the invention is utilized in a polyphase power system, and the variable impedance device employs a solid state device that may be switched by a bi-stable control signal to produce either the high impedance condition or the low impedance condition. When the current requirement of the load returns to a normal operating range, the variable impedance device will automatically close and the impedance of the transformer will return to its normally low value. It is a particular feature of this invention to provide methods and apparatus for limiting the current supplied to inductive cable coupling devices employed in subsea petroleum installations.

15 Claims, 5 Drawing Figures

METHODS AND APPARATUS FOR LIMITING ELECTRICAL CURRENT TO A SUBSEA PETROLEUM INSTALLATION

BACKGROUND OF THE INVENTION

This invention relates to methods and apparatus for limiting the amount of electrical current supplied to a load, and more particularly for limiting the amount of current to a subsea electrical coupler.

There are many applications where it is desirable to limit the electrical current supplied to a load. In many instances, an ordinary circuit breaker may be sufficient to limit the electrical current to a predetermined value. The fact that the circuit breaker may require manual operation to return the circuit to an operative condition may be desirable, since it may be important to realize that the current to the load has exceeded a certain value.

In other applications, it may be beneficial to automatically return the circuit to an operative condition after the current has been limited. This may be accomplished by providing that the circuit breaker return supplied power to the load after a certain interval of time. For instance, if the current to a load exceeds a preselected value and the circuit is broken, the circuit breaker may automatically return the power to the load two seconds after the circuit has been broken. At that time, if the current requirement of the load is within the normal operating range, the circuit is successfully reset. If, on the other hand, an abnormally high current is still being drawn by the load, the circuit breaker will again interrupt the power to the load.

A major disadvantage of using a circuit breaker in series with the load as a current limiting device, as described above, is that after the circuit has been broken, there is no convenient way to predetermine if the load conditions are such that current should be restored. Also, if the load requirement remains excessively high, the response time for the circuit breaker may be such that damage may nevertheless occur because the load was briefly subjected to excessive current.

Methods and apparatus were therefore desired which would safely and accurately limit the current supplied to a load while providing for automatically re-establishing the current supply upon return of the load conditions to normal values. The problem, of course, is complicated when the electrical load and the current limiting devices are located in a remote and hostile environment. For instance, in applications where the current limiting device is located in a subsea environment, a relatively simple yet highly reliable arrangement should be employed in view of the high cost of repairing and-/or replacing such a device. For this reason, subsea applications often dictate that electrical devices employing moving parts and electrical contacts should not be utilized. Further, electrical apparatus utilized in subsea applications are often contained within hermetically sealed enclosures for excluding the seawater and protecting the apparatus against moisture and corrosion, and this presents additional problems if the electrical apparatus is to be repaired or replaced.

In a subsea petroleum production installation, three phase electrical power is typically distributed to numerous satellite wells from a production control manifold. The electrical supply cable connecting the satellite wells to the production manifold may be miles long, and may include one or more inductive power couplers. Simply stated, one of these inductive power couplers is a transformer, and each half of the coupler is sealed to protect the windings from the subsea environment. Inductive couplers allow the electrical supply cable to be effectively mated to or disengaged from an electrical load at this satellite well, without exposing the current conductors to the hostile subsea environment.

A coupler may become accidentally or purposefully disengaged at a time when power is being supplied to the satellite well. Accidental disengagement of the power coupler may result from the limited dexterity of men and equipment working in a subsea environment. Purposeful disengagement most often occurs when either the electrical supply cable is disconnected from one satellite well to be used on a different well, or when a portion of the electrical equipment is disconnected and removed to the surface for repair, service or replacement. When the power coupler is disengaged, the current drawn by that half of the coupler being supplied with power will increase to undesirably high levels, and if the current is not limited that half of the coupler being supplied with power may fail because of excessive heating.

If the current is to be limited to protect the power coupler, the current limiting device should have the capability of restricting the current to a magnitude equal to or less than the maximum non-destructive current capacity of the inductive coupler. Additionally, it is important that as long as the current being supplied to the power coupler is within the maximum amperage of the coupler, the current limiting device should not seriously restrict the power flow to the satellite well or introduce significant power dissipation. In other words, the current limiting device should act to limit the current to a preselected value, but should not introduce appreciable impedance as long as the current is equal to or below a preselected value.

If the power coupler, once becoming unmated and thereby causing the current limiting device to restrict the current to the coupler, later becomes re-mated so that normal load current would be drawn through the power coupler, the current limiting device should be capable of automatically sensing this condition so that the current limiting function will be effectively removed from the supply line. Thus, the current limiting device should have automatic reset capability responsive to the actual load conditions.

As stated earlier, power commonly is distributed from a subsea production manifold through several miles of supply cable to a satellite well. Typically, one power coupler is located at the control module of the satellite well, and the control module essentially is the load for that supply cable. As explained below, it is beneficial, that the current limiting device be located at the production manifold. First, the production manifold is a convenient location to mount the current limiting device. There often is not a location along the electrical supply cable or the satellite well where the current limiting device may be so easily mounted and/or serviced if repair is ever required. Second, having the current limiting device at the production manifold allows the electrical supply cable to be moved to different satellite wells without disturbing or relocating the current limiting device. Most importantly, it is more economical to service, repair or replace the current limiting device if it is conveniently located at the production manifold rather than at the satellite well.

In addition to the difficulties previously discussed relating to the application of current limiting devices in subsea environments, further problems are encountered in providing this current limiting function for a subsea petroleum production installation as described above. First, the high cost of subsea petroleum production installations require that production down time be kept to a minimum, and that, as much as possible, service of equipment be performed on a regularly scheduled basis. Second, it is beneficial that each electrical supply cable be connected to a single current limiting device although the supply cable may include multiple power couplers. A single current limiting device, as compared to multiple current limiting devices for each power coupler, also increases the reliability of the overall system since there are fewer components within the system. However, since the electrical power cable may be miles long, the power couplers may be located long distances from the current limiting device, and it is not practical to provide control circuits extending from the power couplers to the current limiting device. Third, the production manifold must be capable of supplying full electrical power to various other satellite wells at a time when it is necessary to restrict the power to a specific satellite well because a power coupler along its respective electrical supply cable is uncoupled.

The problems and disadvantages of the prior art are overcome with the present invention. Novel methods and apparatus are hereinafter provided for limiting the electrical current to a load, and, more particularly, for limiting the electrical current to a subsea petroleum installation.

SUMMARY OF THE INVENTION

This invention is suitable for limiting the current flow in a single phase or three-phase alternating current power system and is particularly suitable for controlling the current to inductive power couplers commonly used in subsea petroleum installations. In subsea petroleum recovery installations, electrical power is typically distributed from a subsea production manifold via power cables to satellite wells. The power cables generally contain one or more inductive power couplers, for attaching and detaching the power cable to either another power cable or an electrical load without exposing any current carrying components to the sea water.

In an exemplary embodiment of this invention, the current-limiting device may be conveniently mounted near the power input end of the power cable, at the subsea production manifold. As will be explained in detail below, a single current-limiting device is required although the power cable may include several inductive power couplers. The current-limiting device according to this exemplary embodiment consists of three electrical circuits: a current sensing circuit, a control logic circuit, and a protector circuit.

The current sensing circuit is designed to monitor the amount of electrical current being supplied to the power coupler via the power cable. In a suitable embodiment of the invention, this circuit consists of a current transformer connected to one or more legs of the three-phase power supply. The output from the current transformer is therefore directly dependent on the current flow to the inductive power coupler. Alternating current output from the current transformer is then passed through a rectifier to provide an output voltage representative of the magnitude of the three-phase alternating current in the electrical supply cable. A filter circuit associated with the rectifier provides a suitable means for controlling the response time of the current limiting device. The current sensing circuit therefore senses the alternating current in the power supply cable and provides a DC output voltage directly related to the amount of current being supplied to the power coupler.

The DC output voltage from the current sensing device is the input to the control logic circuit. The control logic circuit generates a control signal to the protector circuit. In a suitable embodiment of the invention, the control logic circuit compares the DC voltage from the current sensing circuit to a preselected "high" reference voltage and a preselected "low" reference voltage. As long as the DC voltage from the current sensing circuit is less than the high reference voltage, the signal from the control logic circuit effectively inhibits the current limiting function of the protector circuit. If the DC input voltage exceeds the high reference voltage, the output from the control logic circuit causes the protector circuit to limit the current to the power coupler. Once the current in the power cable has been safely limited, the DC voltage from the current sensing circuit to the control logic circuit will drop below the high reference voltage, yet the control logic circuit will continue to supply the protector circuit with a control signal which will limit the current. However, once conditions return to the normal operating range, the current as limited by the protector circuit will now be abnormally low and produce a corresponding output voltage below the low reference voltage, and the control logic circuit will generate a signal to the protector circuit to remove the current limiting impedance from the supply cable. Thus, the control logic circuit activates the protector circuit if the current in the power cable exceeds a predetermined maximum limit, and deactivates the protector circuit when load conditions return to a normal operating range.

The protector circuit in a suitable embodiment of this invention consists of a tightly coupled transformer and a triac switch. One winding of the transformer is in series with the electrical power cable. The secondary winding of the tightly coupled transformer is connected to the protector triac switch, which is responsive to a signal from the control logic circuit. If the signal to the triac switch indicates normal operating conditions, the triac switch will short circuit the secondary winding of the transformer, and the impedance reflected to the primary of the tightly coupled transformer will be very low. Thus, when the triac switch is closed, the protector circuit is thus effectively removed (in an electrical sense) from the power cable. When the control logic circuit opens the protector triac switch, the resulting high impedance in the secondary circuit of the transformer is reflected to the primary winding, and the tightly coupled transformer exhibits a high impedance which will safely limit the current to the inductive coupler.

The operation of the subsea electrical power system, including the current-limiting device, will now be briefly described. When a coupler in the electrical power cable is mated, the current in the power cable essentially is dependent on the electrical load conditions. Under normal operating conditions, the current requirements are therefore within a normal operating range, and the DC voltage output from the current sensing circuit is not high enough to energize the protector circuit.

When the power coupler becomes unmated, current in the power cable will increase markedly, which produces a high DC voltage to the control logic circuit. If this DC voltage exceeds a predetermined maximum reference voltage, the control logic circuit will cause the protector triac switch to open. Opening the triac switch effectively open circuits the secondary winding of the tightly coupled transformer in the protector circuit, and the impedance of the tightly coupled transformer increases drastically to limit the current being supplied to the inductive power coupler. Thus, the power coupler is protected from an excessive current which might cause damage to the coupler.

As long as the power coupler is unmated, the current being supplied to the primary winding of the coupler will be limited by the protector circuit. Once the power coupler has been re-mated, and the current passing through the power coupler to the load will be substantially lower than normal. Assuming the load requirements at that time are within the normal operating range, the current in the electrical power cable will be very low since the current requirements are within the normal operating range, but the protector circuit is still activated in the current-limiting condition. At this point, the DC voltage input from the current transformer to the logic circuit will drop below the low reference voltage, and the logic circuit will cause the protector triac switch to close. Re-closing the triac switch again effectively short circuits the secondary winding of the tightly coupled transformer, and the impedance of the transformer is reduced to a low value. Thus, the device limits the current to the power coupler and automatically resets the current limiting device when normal operating conditions are resumed.

Accordingly, it is a feature of the present invention to provide improved methods and apparatus for limiting electrical current to a subsea petroleum installation.

It is also a feature of this invention to provide methods and apparatus for limiting the electrical current to several subsea power couplers in a power cable, wherein the current limiting device is remote from the power couplers.

It is a further feature of this invention to provide methods and apparatus for limiting and automatically resetting alternating current supplied to a subsea power coupler.

It is a further feature of this invention to provide a current limiting device for controlling current flow to a subsea electrical power coupler, wherein the device produces an insubstantial voltage drop when the current is below a preselected maximum value.

Another feature of this invention is to provide a current limiting device for limiting three-phase, alternating current, wherein the device is responsive to a single, direct current control source.

It is also a feature of this invention to provide a current limiting device for controlling current flow to a subsea electrical power coupler, wherein a bi-stable output from a logic circuit activates the protector circuit to limit current to a preselected maximum value.

Yet another feature of this invention is to provide a current limiting device for limiting alternating current supplied to a subsea power coupler through a three-phase power cable, wherein current limitation is achieved by altering the impedance of a transformer having a primary winding in series with the power cable.

These and other features and advantages of this invention will become apparent in the following detailed description, wherein reference is made to the figures in the accompanying drawings.

DRAWINGS

DETAILED DESCRIPTION

Figure 1:
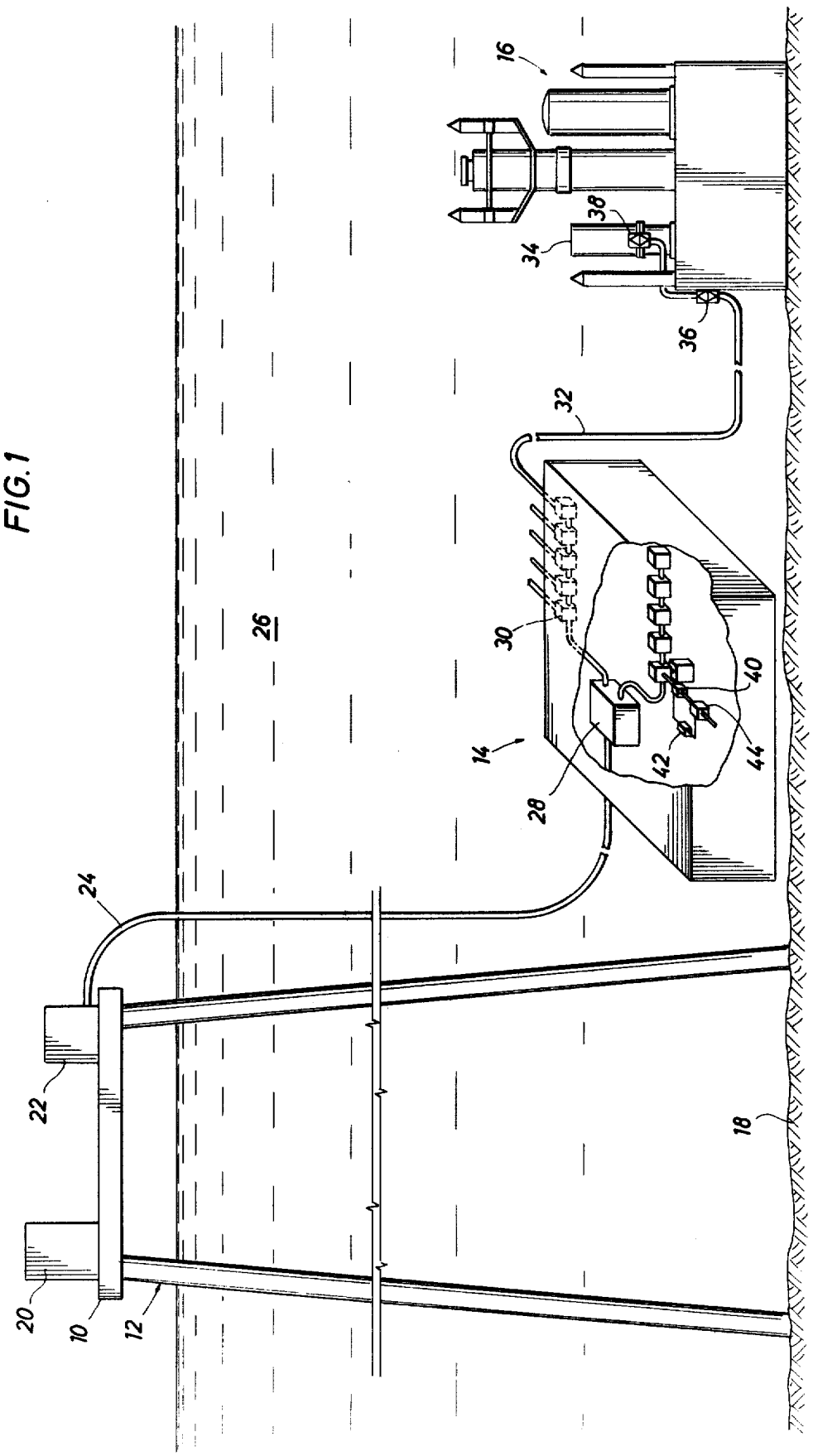
FIG. 1 is a simplified pictorial representation of a subsea petroleum installation including an exemplary embodiment of the invention.

FIG. 1 is a simplified pictorial representation of a typical subsea petroleum installation including a platform 10 positioned above the ocean surface on top of a tower 12, a subsea distribution manifold 14 and a subsea wellhead assembly 16. As shown in FIG. 1, the tower 12 is secured to the ocean floor 18, and platform 10 provides an above-water base for various equipment. For instance, recovery tank 20 may be positioned on the platform 10 for receiving the petroleum from various wellhead assemblies such as wellhead assembly 16. Also positioned on the platform 10 is an electrical power source 22 for supplying electrical power to the distribution manifold 14. Typically, high voltage, three-phase electrical power from the power source 22 will be supplied to at least one distribution manifold 14 via an electrical cable 24.

As shown in FIG. 1, the distribution manifold 14 will generally rest upon the ocean floor, and may be submerged several hundred feet or more, in the water 26. The distribution manifold 14 is typically designed to simultaneously service several subsea petroleum recovery installations, such as wellhead assembly 16. The distribution manifold 14 therefore often contains control modules (not depicted) which monitor various functions within the subsea petroleum installations. As shown in FIG. 1, an additional function of the subsea distribution manifold is to provide electrical power to various wellhead assemblies. To this end, a power transformer 28 is connected to the electrical cable 24 for receiving the high voltage power from the electrical power source 22 and distributing a lower voltage to various underwater satellite feeder couplers 30. For instance, in a typical installation, the electrical power source 22 may generate 4,160 volt three-phase electrical power, which may be supplied to the power transformer 28 via an electrical cable 24 which is 15,000 feet long. The power transformer 28 disburses 440 volt three-phase electrical power to each of the ten underwater satellite feeder couplers 30 depicted in FIG. 1. Each underwater satellite feeder coupler 30 therefore is capable of supplying electrical power to a separate wellhead assembly 16 via a power cable 32. As shown in FIG. 1, the distribution manifold 14 may be centrally located for providing electrical power to ten wellhead assemblies 16. Obviously, the distribution manifold 14 may be properly sized to contain enough underwater satellite feeder couplers 30 to provide electrical power for each of the wellhead assemblies to be serviced. The number of underwater satellite feeder couplers 30 contained in the distribution manifold 14 is therefore dependent on the number of wellhead assemblies to be serviced by that distribution manifold 14.

The power cable 32 transmits electrical power from the underwater satellite feeder coupler 30 to the wellhead assembly 16, and this power cable may be several miles in length. As shown in FIG. 1, the power cable 32 supplies electrical power to a control module 34 located within the wellhead assembly 16. Contained within the control module 34 are various electrically powered devices which constitute the load for the electrical system. As will be explained in further detail below, the power cable 32 generally contains one or more inductive power couplers so that portions of the power cable may be easily disengaged. As shown in FIG. 1, the power cable 32 includes a tree coupler 36 and a module coupler 38. Other power couplers (not depicted) may be spaced apart along the power cable 32.

Referring again to FIG. 1 and particularly to the distribution manifold 14, there may be seen a typical representation for the placement of a current sensing circuit 40, a control logic circuit 42, and a protector circuit 44. Each of these circuits will be described in further detail below, however it is appropriate at this point to note that all three circuits may typically be contained within the distribution manifold 14. Also, although FIG. 1 merely illustrates each of these three circuits for one of the power cables 32, it is understood that each of the power cables 32 connecting the distribution manifold 14 to various wellhead assemblies 16 may similarly contain their respective current sensing circuit 40, a control logic circuit 42, and a protector circuit 44. Although the circuits 40, 42 and 44 are illustrated separately in FIG. 1, it is to be understood that the separation is for illustrative purposes, and the circuits may be physically arranged in one unit. For example, the circuits 40, 42 and 44 may all be contained within a hermetically sealed package with the secondary of the underwater satellite feeder coupler 30.

Figure 2:
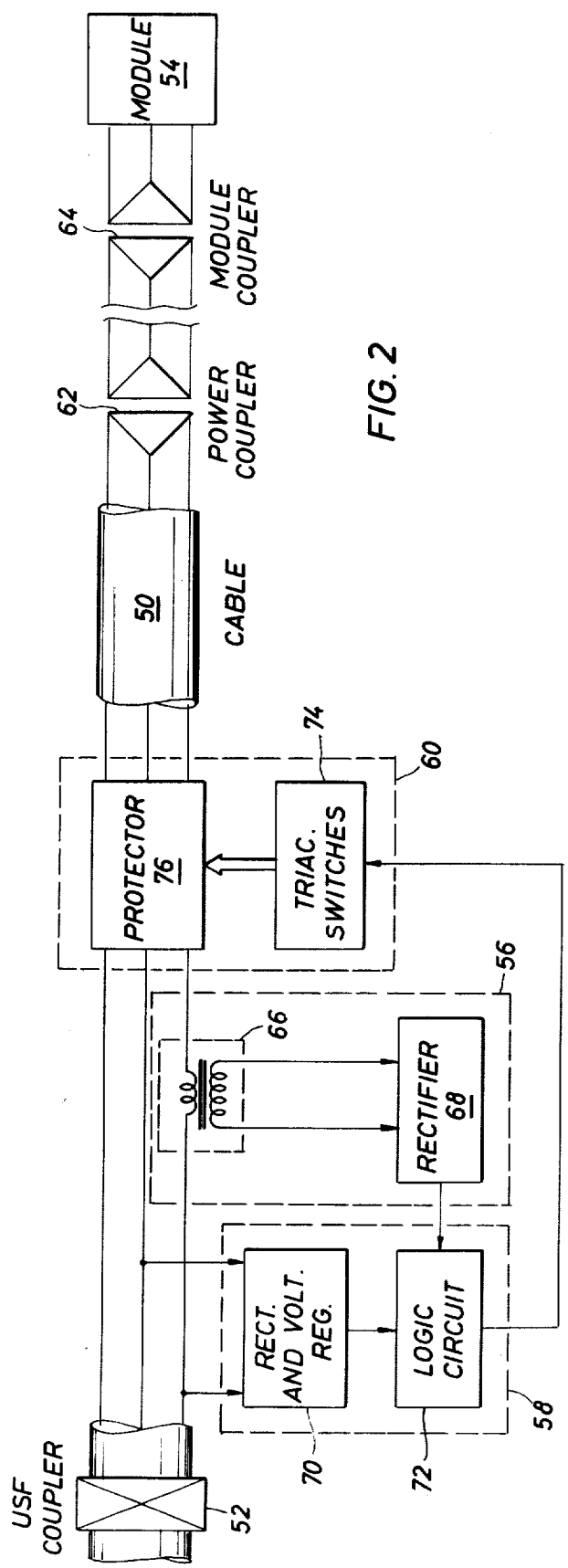
FIG. 2 is a simplified functional representation of the invention depicted in FIG. 1.

Referring now to FIG. 2, there is shown in block diagram form simplified functional representation of the current control system of the apparatus depicted in FIG. 1. A power cable 50 is shown connecting the manifold coupler or USF coupler 52 to the module 54. Relating FIGS. 1 and 2, the power cable 50 corresponds to the power cable 32, the USF coupler 52 corresponds to the underwater satellite feeder coupler 30, and the module 54 corresponds to the control module 34. Also shown in FIG. 2 by dash lines are a current sensing circuit 56, a control logic circuit 58, and a protector circuit 60 corresponding to the respective circuits 40, 42 and 44 shown in FIG. 1. FIG. 2 also shows a power coupler 62 and a module coupler 64. The couplers 62 and 64 are structurally similar to the module coupler 38 and the tree coupler 36 shown in FIG. 1. The function of these couplers is to enable disconnecting the power cable, at either end or along its length, in a manner such that no current carrying conductor is exposed to the sea water.

Each of these couplers comprises a transformer core with a winding in each half of the coupler. The two halves of the coupler may be brought together manually or by remote manipulation and held together by aligning pins and an external clamp. An example of one such inductive coupler that may be used in my invention is more fully described in a paper presented at the 11th Annual OTC in Houston, TEX. on Apr. 30–May 3, 1979 entitled "A High Integrity Electrohydraulic Subsea Production Control System" authored by E. W. Locheed, Jr. and R. Phillips. Each half of the coupler is sealed to protect the windings from the subsea environment. When the coupler is mated, the two halves of the coupler are in close proximity and the air gap between the cores is reduced to approximately 0.005" and, consequently, the two coupler halves act together as a tightly coupled transformer to pass current from one side of the coupler to the other side of the coupler. The couplers, however, can become easily unmated by physically drawing the two halves of the coupler apart. In this case, inductive power to the module is interrupted. Thus, the inductive power couplers provide a means whereby subsea electrical power cables can be attached or detached from an electrical load or another power cable so that repair and/or service can be performed on the electrical load. As will be explained in further detail below, the problem exists that when the power coupler is unmated, the current drawn by the winding in the half of the power coupler being supplied with power may increase substantially and injure or destroy that winding. Thus, my invention provides means for limiting the current being drawn by the coupler and serves to protect the coupler.

Referring again to FIG. 2, it may be seen that the current sensing circuit 56 includes a current transformer 66 and a rectifier 68. As shown in FIG. 2, the current transformer 66 supplies the rectifier 68 with a voltage dependent on the current in one leg of the power cable 50. It is within the scope of the present invention, however, that the current transformer 66 will supply the rectifier 68 with an output dependent on the current in one or more of the phase conductors in a polyphase power cable. Rectifier 68 functions to produce a DC voltage output having a magnitude dependent on the magnitude of the alternating current input from the current transformer 66. Thus, the magnitude of the DC voltage output from rectifier 68 is representative of and dependent on the alternating current in the power cable 50. As will be explained in further detail below, the output from the rectifier 68 is applied to the control logic circuit 58.

The control logic circuit 58 shown in FIG. 2 contains a rectifier and voltage regulator 70 and a logic circuit 72. The rectifier and voltage regulator 68 is supplied with electrical power from the cable 50, and functions to provide a regulated direct current power source for the logic circuit 72. As will be explained in further detail below, the logic circuit 72 compares the voltage from the rectifier 68 to a predetermined high reference voltage and a predetermined low reference voltage. Both the high and low reference voltages are obtained from the output of the rectifier and voltage regulator 70. It will be noted that the control logic circuit 58 provides a bi-stable or digital output to the protector circuit 60. Thus, the control signal to the protector circuit 60 is not an analog signal, but preferably a bi-stable or two-level control signal.

As shown in FIG. 2, the output from the control logic circuit 58 applies a control signal to the triac switches 74 within the protector circuit 60. As explained in detail hereinafter, open circuiting of the triac switches 74 causes a substantial increase in the impedance of the protector 76, and it is this increase in the impedance which produces a corresponding decrease in the current being supplied to the power coupler 62 and the module coupler 64.

Figure 3:
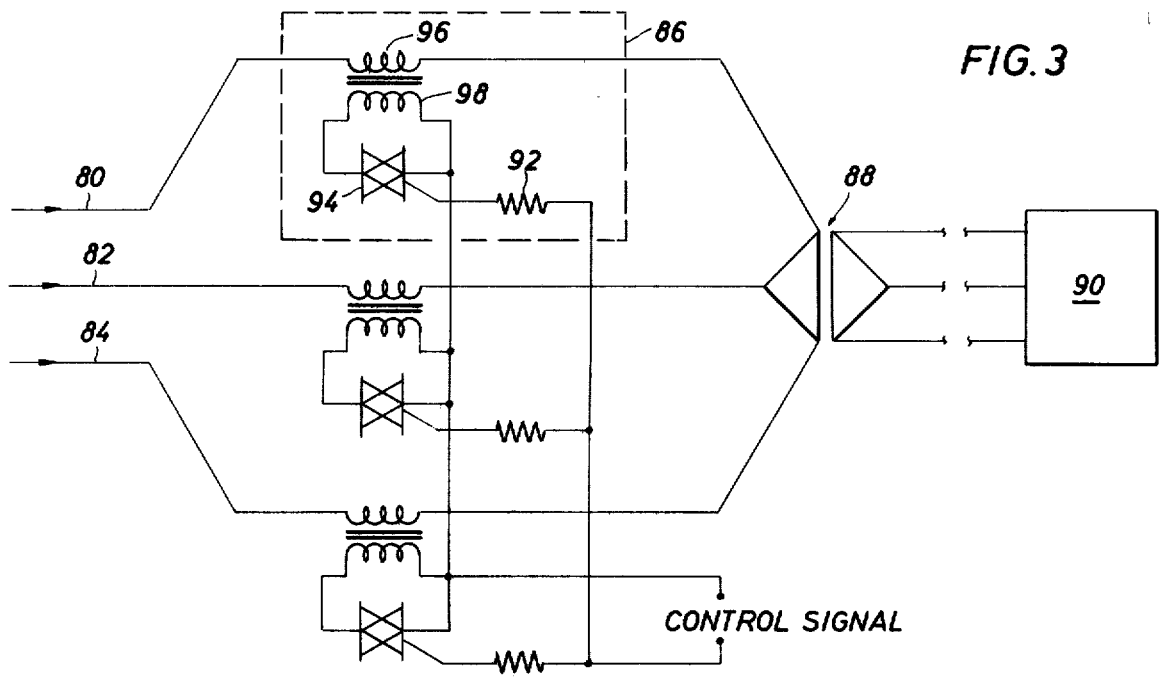
FIG. 3 is a simplified functional representation of another portion of the apparatus generally depicted in FIG. 2.

The operation of the protector circuit 60 is illustrated in FIG. 3, which illustrates, schematically, a portion of the apparatus which is generally depicted in FIG. 2. In FIG. 3, each phase conductor 80, 82 and 84 of the three-phase power cable is shown to contain its respective protector circuit 86. The three phase conductors, 80, 82 and 84 are connected to the coupler 88, and thereafter connected through an additional length of cable to the load 90. In FIG. 3, a signal from a control logic circuit 58 is applied to the protector circuit 86 for each of the three legs. The signal from the control logic circuit 58, referred to as the triac control voltage, first passes through a current limiting resistor 92 and thereafter to a triac 94. Triac 94 is a bi-laterally conductive semi-conductor device having the capability of switching between two conductivity states, and functions as a solid state switch. A further explanation of a triac that may be used in my invention is found in "Electronics Engineers' Handbook", by Donald G. Fink commencing at Sec. 15-7 (First Edition). Limiting resistor 92 operates to limit the control current to the triac 94 to a safe value. The protector circuit 86 is also shown to contain a tightly coupled transformer with a primary winding 96 and a secondary winding 98. As shown in FIG. 3, the primary winding 96 is in series with leg 80 of the power cable, and the secondary winding 98 is connected to the protector triac switch 94.

When the current in the power cable 50 is within the normal operating range, the signal from the control logic circuit 58 causes the protector triac switch 94 to be closed. The secondary winding 98 of the protector circuit 86 is thus effectively short-circuited, a very low impedance is reflected to the primary winding, and leg 80 of the power cable 50 thus sees this low impedance, which has the effect of applying the full power-source voltage to the load. If the current in the power cable 50 exceeds a maximum preselected value, a signal from the control logic circuit 58 causes the protector triac switch 94 to open, which open-circuits the secondary winding 98 of the transformer in the protector circuit 86. When the secondary winding 98 is open-circuited, the primary winding 96 provides a series inductive reactance which effectively limits the current that can be supplied through leg 80. Though the operation of the protector circuit 86 was described above for a single leg 80 of the power cable 50, it is apparent that the protector circuits or legs 82 and 84 function in an identical manner. Further, it will be noted that each of the protector circuits or legs 80, 82 and 84 are controlled by one signal from the control logic circuit 58.

The arrangement shown in FIG. 3 shows three separate protector circuits 86 placed in series with each leg of the three-phase power cable 50. An alternate embodiment of this portion of the invention which has the same effect as the arrangement shown in FIG. 3 follows. Both the primary windings 96 and secondary windings 98 of the three protector circuits 86 may be wound on an E-I configuration three-phase transformer core. In this arrangement, the primary windings 96 and the secondary windings 98 for each leg of the core may be bifilar wound to provide tight coupling between the windings.

Figure 4:
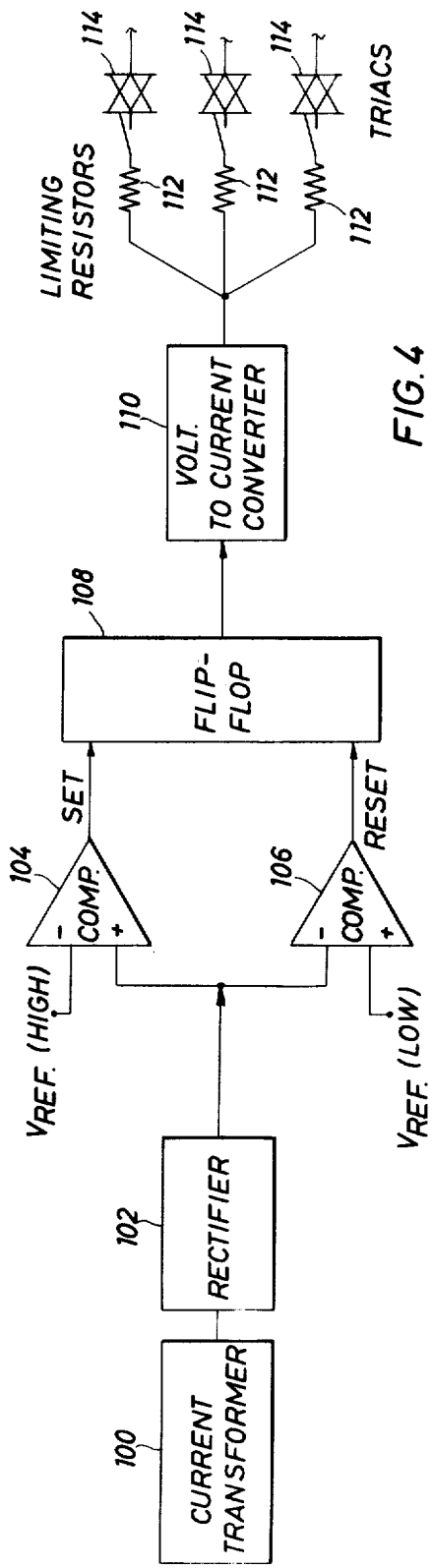
FIG. 4 is a simplified functional representation of a portion of the apparatus depicted in FIG. 2.

FIG. 4 illustrates schematically a portion of the apparatus depicted in FIG. 2. In FIG. 4, the line current sensor 100 corresponds with the current transformer 66 in FIG. 2; the rectifier 102 corresponds with rectifier 68. The DC voltage from the rectifier 102 is the input to both a high reference comparator 104 and a low reference comparator 106. Comparators 104 and 106 respectively compare the DC voltage from the rectifier 102 with a preselected high reference voltage and a preselected low reference voltage. Assuming the current in the power cable 50 is within its normal operating range, the DC voltage from rectifier 102 will not be high enough to activate the high voltage comparator 104, nor will the voltage from rectifier 102 be low enough to activate the low reference voltage 106. In this case, the signal from the rectifier 102 will pass to the flip-flop 108, and thereafter to the voltage to current converter 110.

The converter 110 substantially amplifies the current of the signal from the flip-flop 108 so as to provide a sufficient power gain to activate the triac switch 114. When the current in the power cable 50 is thus within its normal operating range, the flip-flop 108 will be such that the output from the converter 110 will be high and the signal to the three triacs depicted in FIG. 3 will fire the triacs. Firing the triacs causes the secondary of the protector to be short-circuited, thus effectively removing the protector from the power cable 50.

If the current in power cable 50 exceeds a predetermined level indicative that either coupler 62 or coupler 64 is de-coupled or that there is a fault in the cable 50, the output from rectifier 102 will rise to a voltage level exceeding the high reference voltage, thereby causing the high voltage comparator 104 to set the flip-flop 108, and thus turning off the triacs 114. This, in turn, open-circuits the secondary winding of the protector, reflects a high impedance to the primary windings, and thus the current in the power cable 50 is limited to a safe value.

When the coupler 62 or 64 is re-connected or the fault is otherwise cleared, the current in power cable 50 will be substantially reduced since the protector is still limiting the current to the load. In this case, the voltage output from the rectifier 102 will drop below the preselected low reference voltage, causing the low voltage comparator 106 to go high, resetting the flip-flop 106 and firing the triac 114 which effectively removes the protector 76 from the circuit.

If, when the power system is first energized, the flip-flop 108 is in a position which causes the protector to be actuated, the current being supplied to the load will be so minimal that the DC output voltage from the rectifier 102 will be lower than the preselected low reference voltage. The low voltage comparator 106 will sense this condition, causing the flip-flop 108 to de-actuate the protector.

Figure 5:
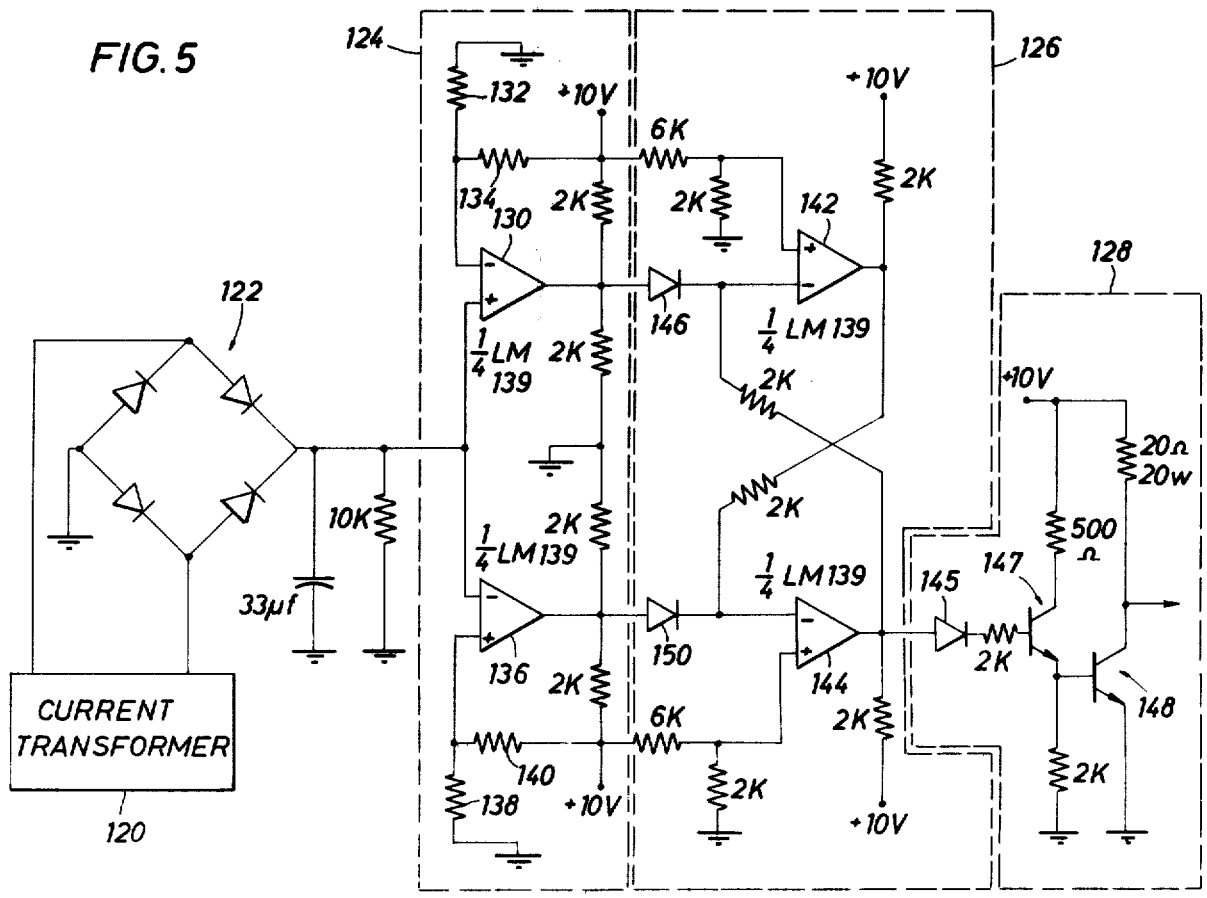
FIG. 5 is a detailed pictorial representation of a portion of the apparatus depicted in FIG. 3.

FIG. 5 illustrates, in detailed schematic, a logic circuit which may be used in systems shown in FIGS. 3 and 4. It will be readily apparent, however, that the circuit shown in FIG. 5 is merely intended to be representative of one type of logic circuit which may be used in the instant invention, and that other logic circuits can be employed to accomplish the same objectives. In FIG. 5, a current transformer 120 and a bridge rectifier 122 correspond to the current transformer 66 and the rectifier 68 illustrated in FIG. 2. Further, that portion of the circuit which corresponds to comparators 104 and 106 of FIG. 4 is enclosed within the dotted line 124. Likewise, the flip-flop 108 illustrated in FIG. 3 is shown within the dotted line 126, and the voltage to current converter 110 is illustrated within the dotted line 128.

Referring again to FIG. 5, it may be seen that the high limit comparator 130 tests the DC output from the bridge rectifier 122 against a high limit reference voltage. In FIG. 5, the amplitude of the high limit reference voltage is established through the selection of resistors 132 and 134. In a similar manner, the low limit comparator 136 tests the output from the bridge rectifier 122 against a preselected low reference voltage existing between resistors 138 and 140.

If the output from the bridge rectifier 122 exceeds the high limit reference voltage, the output from the high voltage comparator 130 goes high, which in turn produces a low output from element 142. It may be seen that a low output from element 142, in turn, produces a high output from element 144. A high output from element 144 turns off steering diode 146 and thereby isolates the output from comparator 130 from the rest of the circuit.

As shown in FIG. 5, the high level output from comparator 144 is fed to transistors 147 and 148, forcing the collector of transistor 148 low, which, in turn, turns off the triac and activates the protector circuit.

When the DC output from rectifier 122 falls below the low limit reference voltage, the output from the low limit comparator 136 goes high, which forces the output from element 144 low. This, in turn, forces the output of element 142 high, thus turning off diode 150, thereby isolating the output of the low voltage comparator 136 from the rest of the circuit. A low voltage output from the element 144 turns off transistor 148, which allows the collector of transistor 148 to rise towards the +10 power supply voltage, which fires the triacs. When the triacs are fired, the protector circuit is deactivated and the full current in power cable 50 is supplied to the load. Alternatively, any conventional set-reset flip-flop can be used in place of the flip-flop 126 described above. The circuit in FIG. 5 shows a representative power supply voltage of +10 volts; values for various components in the circuit are noted, and comparators 130 and 136, as well as elements 142 and 144, are designated in conventional fashion as ¼ LM 139.

When the output from the rectifier 122 is between the preselected maximum reference voltage and the preselected minimum voltage, the output transistor in both comparators 130 and 136 are saturated, holding the anode side of diodes 146 and 150 at a maximum of +1 volt. The collector of the output transistor of element 142 is open, allowing the output of element 142 to rise to +10 volts, which places the cathode side of diode 150 at +10 volts and turns diode 150 off. The +10 volts also turns on the output transistor of element 144, pulling its output down to a maximum of +1 volt and turning off transistors 147 and 148.

Diode 145 guarantees that transistors 147 and 148 are turned off when the output of element 144 is low. No change of state of elements 142 and 144 is possible until the output of the rectifier 122 exceeds the high reference voltage at comparator 130. No transition of elements 142 and 144 can result from a change in the output of comparator 136 since its output voltage can rise no higher than +5 volts which is not sufficient to turn on diode 150.

When the high reference voltage is exceeded, this forces the output transistor in comparator 130 off and allows the collector of this transistor to rise toward +5 volts, which passes through diode 146. The output transistor of element 144 is off, and the 2 kilo-ohm resistor from +10 volts to its collector supplies base current to transistors 147 and 148, causing the output of transistor 148 to go low, which turns off the triacs and activates the protector circuit.

The logic circuit will remain in this state until the output from the bridge rectifier 122 falls below the low reference voltage which forces the output of comparator 136 high and returns the protector circuit to its normal condition.

Referring again to FIG. 2, the operation of my invention will be more fully described. Normally, both the power coupler 62 and the module 64 are mated, and the current in power cable 50 is supplied to the module 54. Under normal operating conditions, the current required by the module 54 is sufficiently low that the output from the rectifier 68 is not large enough to operate the protector circuit 60. Normal fluctuations in the power required by the module 54 will therefore generally produce an output from the rectifier 68 which is between the high reference voltage and the low reference voltage. If the module 54 requires no power, the current in the power cable 50 will drop to a very low value, and the output from the rectifier 68 may then fall below the low reference voltage. This, however, has no effect on the protector circuit since a value from the rectifier 68 below the low reference voltage simply causes the control logic circuit 58 to remove the protector circuit 60 from the system. If, however, the current in the power cable exceeds a preselected maximum limit, the output from rectifier 68 will rise, and the control logic circuit 58 will send a signal to the protector circuit 60 which will open the triacs and increase the impedance of the protector 76 to limit the current in the power cable 50 to a safe value.

If either the power coupler 62 or the module coupler 64 becomes unmated, the current in the power cable 50 increases substantially. If the current in the power cable 50 is not limited, this increased current may damage the coupler, as previously described. The increased current, however, produces a higher output from the rectifier 68, which activates the protector circuit 60 to limit the current in the power cable 50 before the coupler is damaged. For instance, if the power coupler 62 becomes unmated, the protector circuit 60 will limit the current in the power cable 50 to a safe value to protect the power coupler 62. If the power coupler 62 is later re-mated, the current in the power cable 50 will fall to a value below that encountered under normal operating conditions since the protector circuit 60 is still further limiting the current in the power cable 50. This, in turn, produces an output from the rectifier 68 which is sensed by the control logic circuit 58, and thus the signal to the triac switches 74 removes the protector 76, and reestablishes the normal operating current to the module 54.

Although the invention has been suitably described above for application in a three-phase power system, this invention is applicable for either single-phase alternating power systems or polyphase power systems.

My invention is suitable for limiting alternating current to a subsea petroleum installation, and is particularly suitable for limiting the current being supplied to an elongated, inaccessible subsea power cable that includes along its length one or more inductive couplers.

My invention is particularly advantageous for use in subsea control systems which require remote manipulation, disconnection, and reconnection of power cables employing inductive couplers. In such systems the inductive couplers, for practical reasons, are designed for reduced physical size, and while entirely adequate for transmission of normal load currents, they are subject to overheating and consequent damage if full power-source voltage is applied continuously to the cable when one of the couplers is disconnected. My invention resolves this difficulty by providing for automatic limiting of the power-cable current immediately upon any couplers being disconnected.

The present invention is not, however, to be limited to the apparatus described herein and, as stated previously, many other control logic circuits may be employed within the concept of the present invention other than the one control circuit given.

Many other alternative forms of the present invention will, of course, also be apparent from the foregoing methods and apparatus. Accordingly, the structures and techniques hereinbefore depicted and discussed are illustrative only, and are not intended as limitations on the scope of the present invention.

What is claimed is:

1. A method of limiting the current in an alternating, current power system for supplying electrical power to a load comprising:
    providing a primary winding connected in a series with a current conductor of said system and a secondary winding inductively coupled to said primary winding;
    sensing the current amplitude in said power system
    generating a first signal representative of said current amplitude in said power system;
    repeatedly comparing said first signal with first and second reference signals representative, respectively, of a predetermined high current value and a predetermined low current value;
    automatically open-circuiting said secondary winding when said first signal exceeds said first reference signal for limiting current to said load; and
        thereafter automatically short-circuiting said secondary winding when said first signal becomes smaller then said second reference signal for returning normal current to said load.

2. The method as defined in clam 1, wherein said predetermined high current value is related to the permissible maximum current in said power system, and said predetermined low current value is substantially lower than normal current in said current conductor.

3. The method as defined in claim 1, wherein said first signal is an electrical signal having a voltage representative of said current amplitude in said conductor, and said first and second reference signals are each electrical signals having a voltage representative, respectively, of said high current value and said low current value.

4. In a subsea oil production system including a plurality of oil well assemblies, a subsea electrical power distribution module for supplying alternating current to said oil well assemblies, and a power cable extending from said distribution module to one of said oil well assemblies, the improvement comprising:
    current sensing means for generating a first signal representative of the current amplitude in a current conductor of said power cable;
    logic means responsive to said first signal for generating a two-level control signal;
    protector means for limiting the current in said power cable, said protector means including
        (a) a first winding connected in series with said current conductor,
        (b) a second winding inductively coupled to said first winding, and
        (c) automatic variable impedance means responsive to said two-level control signal for substantially short circuiting said second winding when the current amplitude in said conductor becomes lower than a predetermined minimum, and thereafter substantially open circuiting said second winding when said current amplitude becomes substantially higher than a predetermined maximum;
    and with said logic means including
        means for providing a high reference signal related to said predetermined maximum and a low reference signal related to said predetermined minimum, and
        comparison means responsive to said first signal and said reference signals for producing a control signal of a first value when said first signal becomes larger than said high reference signal, maintaining said control signal at said first value irrespective of variations of said first signal until said first signal becomes smaller than said low reference signal, and producing a control signal of a second value from the time that said first signal becomes smaller than said low reference signal until said first signal again becomes larger than said high reference signal.

5. In a subsea oil production system which includes a plurality of distantly-spaced oil well assemblies each comprising equipment that requires electrical power, and a subsea electrical power distribution module comprising alternating current apparatus for supplying power to a plurality of said oil well assemblies, the combination of:
    a plurality of power cables extending respectively from said module to different ones of said oil well assemblies, with each of said power cables including at least one inductive coupling device which exhibits a relatively low terminating impedance when it is de-coupled and is vulnerable to being damaged if subjected to alternating currents exceeding a predetermined maximum; and
    current limiting means located adjacent said alternating current apparatus for sensing the current amplitude in a current conductor of one of said power cables and selectively introducing into and removing from said current conductor an auxiliary impedance of a magnitude sufficient to limit the conductor current to said predetermined maximum, said current limiting means comprising
        (a) sensing means for producing a line-current-representative signal representative of the current flowing in said current conductor,
        (b) means for providing a first reference signal and a second reference signal representative respectively, of a predetermined higher than normal power-cable current and a predetermined lower than normal power-cable current,
        (c) a transformer comprising a primary winding connected in series with said current conductor and a secondary winding inductively coupled to said primary winding,
        (d) comparison means for repeatedly comparing said line-current-representative signal with said first reference signal and with said second reference signal,
        (e) means for substantially open-circuiting said secondary winding automatically when said line-current-representative signal becomes larger than said first reference signal, and
        (f) means for thereafter substantially short-circuiting said secondary winding automatically when said line-current-representative signal becomes smaller than said second reference signal.

6. An apparatus as defined in claim 5, wherein said comparison means includes means responsive to said line-current-representative signal, said first reference signal, and said second reference signal for producing a control signal of a first value when said line-current-representative signal becomes larger than said first reference signal, maintaining said control signal at said first value irrespective of variations of said line-current-representative signal until said line-current-representative signal becomes smaller than said second reference signal, and thereafter producing a control signal of a second value from the time that said line-current-representative signal becomes smaller than said second reference signal until said line-current-representative signal again becomes larger than said first reference signal.

7. An apparatus as defined in either claims 5 or 6, wherein said current limiting means comprises a bilaterally conductive semiconductor switching device connected across said secondary winding and connected to receive and respond to control signals generated by said comparison means.

8. An apparatus as defined in either claims 5 or 6, wherein said distribution module supplies three-phase alternating current to said oil well assemblies, and said current limiting means comprises:
three of said primary windings with each primary winding being in series with a phase conductor of said one of said power cables;
three secondary windings each inductively coupled to a respective one of said primary windings; and
three semiconductor switching devices each being connected in series with a respective one of said secondary windings and each being responsive to said control signal from said comparison means for switching the effective impedance of its associated primary winding from a predetermined minimum impedance condition to a predetermined maximum impedance condition and vice versa.

9. In a subsea oil production system including a plurality of oil well assemblies, a subsea electrical power distribution module for supplying polyphase alternating current to said oil well assemblies, at least first and second polyphase power cables extending respectively from said distribution module to first and second ones of said oil well assemblies, and at least one inductive coupling device connected in series with said first power cable, the improvement comprising:
current sensing means for generating a first signal representative of the current amplitude in at least one of the phase conductors of said first power cable;
logic means responsive to said first signal for generating a two-level control signal; and
protector means responsive to said control signal for limiting the current in said first power cable, said protector means including
(a) a plurality of first windings each connected in series with a respective one of the several phase conductors of said power cable,
(b) a plurality of second windings each inductively coupled to a respective first winding, and
(c) automatic variable impedance means responsive to said control signal for substantially short circuiting each of said second windings when the current amplitude in said at least one of said phase conductors becomes lower than a predetermined minimum, and thereafter substantially open circuiting each of said second windings when said current amplitude becomes higher than a predetermined maximum.

10. An apparatus as defined in claim 9, wherein said variable impedance means comprise a bilaterally conductive semiconductor switching device connected across each of said second windings and connected to receive and respond to said two-level control signal.

11. An apparatus as defined in claim 9, wherein said distribution module supplies three-phase alternating current to said oil well assemblies, and said protector means comprises:
three said first windings with each first winding being in series with a phase conductor of said first power cable;
three said second windings each inductively coupled to a respective one of said first windings; and
three semiconductor switching devices each being connected in series with a respective one of said second windings and each being responsive to said control signal for switching the effective impedance of its associated first winding from a minimum impedance condition to a maximum impedance condition and vice versa.

12. An apparatus as defined in claim 9, wherein said current sensing means comprises:
means for generating an a-c voltage of a magnitude dependent on the current in said first power cable; and
rectifier means responsive to said a-c voltage for generating and applying to said logic means a d-c voltage first signal of a magnitude dependent on the current in said first power cable.

13. An apparatus as defined in claim 9, wherein said logic means comprises:
means for providing a high reference signal related to said predetermined maximum and a low reference signal related to said predetermined minimum; and
comparison means responsive to said first signal and said reference signals for producing a control signal of a first value when said first signal becomes larger than said high reference signal, maintaining said control signal at said first value irrespective of variations of said first signal until said first signal becomes smaller than said said low reference signal, and producing a control signal of a second value from the time that said first signal becomes smaller than said low reference signal until said first signal again becomes larger than said high reference signal.

14. Apparatus for limiting current in an alternating current power system for supplying electrical power to a load, comprising:
a primary winding connected in series with a current conductor of said system,
a secondary winding inductively coupled to said primary winding;
a current sensor for sensing the current amplitude in said power system and producing a first signal representative of said current amplitude;
means for providing a first reference signal and a second reference signal representative, respectively, of a predetermined higher than normal power system current and a predetermined lower than normal power system current;
comparison means for repeatedly comparing said first signal with said first reference signal and said second reference signal;

means for substantially open-circuiting said secondary winding automatically in response to said comparison means when said first signal becomes larger than said first reference signal; and means for thereafter substantially short-circuiting said secondary winding automatically in response to said comparison means when said first signal becomes smaller than said second reference signal.

15. The apparatus defined in claim 14, wherein said current sensor comprises:

means for generating an a-c voltage of a magnitude dependent on the current amplitude in said power system;
and
rectifier means responsive to said a-c voltage for generating and supplying to said comparison means a d-c voltage first signal represenative of said current amplitude.

* * * * *